United States Patent
Gancy

[15] 3,652,382
[45] Mar. 28, 1972

[54] HIGH SURFACE AREA CHRYSOTILE AND METHOD OF MAKING SAME

[72] Inventor: Alan B. Gancy, W. Acton, Mass.
[73] Assignee: FMC Corporation, New York, N.Y.
[22] Filed: July 29, 1969
[21] Appl. No.: 845,892

[52] U.S. Cl. .................................................162/3, 162/153
[51] Int. Cl. .........................................................C03b 37/00
[58] Field of Search ..............162/3, 102, 153; 264/212, 63, 264/28; 106/287

[56] References Cited

UNITED STATES PATENTS

| | | | |
|---|---|---|---|
| 130,663 | 8/1872 | Rosenthal | 162/3 |
| 3,297,516 | 1/1967 | Naumann | 162/3 |
| 3,458,393 | 7/1969 | Battista | 162/149 X |

Primary Examiner—Howard R. Caine
Attorney—Milton Zucker, Eugene G. Seems and Robert D. Jackson

[57] ABSTRACT

Chrysotile fibrils having high surface are obtained by (1) attriting chrysolite asbestos in the presence of sufficient dilute mineral acid to free the fibrils without significantly affecting the $SiO_2$:MgO ratio; (2) treating the freed fibrils with sufficient mineral acid to form a layer of $SiO_2$ on the fibril surface; (3) treating the acidified fibrils with alkali to dissolve the $SiO_2$ layer, and (4) washing fibrils to remove excess alkali.

5 Claims, No Drawings

HIGH SURFACE AREA CHRYSOTILE AND METHOD OF MAKING SAME

BACKGROUND OF THE INVENTION

1. Field of the Invention

This invention relates to asbestos minerals. More particularly, it pertains to chrysotile which has been modified whereby the surface area of the fibrils has been increased.

2. Description of the Prior Art

Asbestos is a general term applied to a class of minerals capable of being separated into flexible fibers which are used in the manufacture of noncombustible fabrics. Of the several types of asbestos, chrysotile is the most important. Chemically it is a hydrous magnesium silicate of the formula $Mg_3Si_2O_5(OH)_4$. The crystalline make-up of chrysolite is generally recognized as consisting of parallel bundles of exceedingly fine filaments or fibrils having diameters of the order of 50 to 500 angstroms while their length may average one-eighth inch and upwards. The fibrils are tightly packed and held in position by molecular forces, probably secondary valence forces.

The fabrics manufactured from asbestos consist of a mat or woven network of chrysolite fibers with little or none of the individual fibrils present. This is not surprising since the commercial process of separating asbestos fibers from the base rock is a mechanical system which leaves the fibrils still firmly bound to one another.

For some time, those skilled in the asbestos art have strived to effect separation of the packed chrysolite fibrils with a view to obtaining improved asbestos products. For instance, U.S. Pat. No. 2,626,213 to Novak describes a method of forming individual chrysolite fibrils by treating chrysolite rock asbestos with a surface active compound. According to the patent specification, the surface active agent penetrates between the fibrils, thereby weakening the molecular binding forces. The resulting freed or individualized fibrils, which have a layer of surfactant adsorbed on their surface, form smooth dispersions having excellent colloidal properties. On drying the dispersion, the resulting mat of long oriented fibrils can be twisted into strong yarn.

Another method of separating chrysolite fibrils is to treat asbestos fibers with a dilute mineral acid such as hydrochloric acid in the manner set forth in Battista et al. Ser. No. 701,838, filed Jan. 31, 1968 now U.S. Pat. No. 3,458,393. In this procedure, the acid attacks the surface of the fibrils forming thereon a coating of hydrated silica. Apparently the binding molecular forces are disrupted since mechanical attrition frees the silica coated fibrils which form a stable dispersion.

It is to be noted that in both the Battista et al. and Novak procedures, the separated fibrils are coated with a layer of foreign substance. In the case of Novak, the chrysolite fibrils contain an adsorbed layer of surfactant; in the case of Battista et al. the coating is a layer of hydrated silica. So far as I am aware, the individualized and separated chrysolite fibril, free of an extraneous surface layer has thus far not been realized.

SUMMARY OF THE INVENTION

I have now discovered a modified chrysolite characterized by high surface area of unaltered chrysolite which is obtained by (1) attriting chrysolite asbestos in the presence of sufficient acid to free and separate the fibrils while leaving the $SiO_2:MgO$ ratio essentially unaltered; (2) acidifying the freed fibrils to form a layer of $SiO_2$ on the fibril surface and (3) removing the $SiO_2$ layer. The product is useful, because of its high surface area, as a viscosity altering agent for organic liquids e.g., thixotropic gels of tricresyl-phosphate and the like.

DESCRIPTION OF THE INVENTION AND THE PREFERRED EMBODIMENTS

In carrying out the invention, generally satisfactory results are realized by subjecting asbestos to high energy attrition in liquid media containing sufficient acid whereby separation of the asbestos fibrils is effected without removing any significant amount of magnesium. This treatment produces a dispersion consisting of individual asbestos fibrils, the dimensions of which average about 20–50 m$\mu$ in diameter and about 20–50 m$\pi\lambda$ in length. The surface area, as determined on the dried isolated fibrils, is about 25 square meters per gram.

The dispersion is next treated with strong acid which attacks the asbestos fibrils, thereby forming on the surface thereof a coating of hydrated silica. The amount of acid and the duration of the treatment will, of course, determine the extent of conversion. Elevated temperatures accelerate the conversion. The degree of acid treatment can be ascertained by taking a sample of the treated material and analyzing for magnesium.

The surface area of the silica coated fibrils is much higher than the original fibrils, being in the neighborhood of about 160 square meters per gram after moderate acidification. The surface area, of course, is a function of the degree of silica conversion. For low conversion, the surface area will approach that of the original fibril—25 square meters per gram; for high conversion, the surface area will approach that of the fully silicified fibril—900 square meters per gram.

The silica layer is next removed from the fibril surface. This is conveniently effectuated by treating the silicified fibrils with an alkaline material whereby the silica layer is dissolved off thereby exposing the underlying asbestos fibril surface. The so-treated fibrils are separated from the alkaline medium and dried. The surface area of the product measures 90 square meters per gram, or almost three times that of the asbestos fibrils prior to treatment according to the invention.

In forming a dispersion of the asbestos fibrils, excellent results are achieved by agitating the asbestos and dilute acid in any of the high energy attriting devices available in the art. A particularly convenient agitator is the familiar Waring blender, a high shear type of mixer. Any of the common mineral acids are suitable in producing the dispersion of the asbestos fibrils. Care must be taken to use the acid in sufficient concentration to free the fibrils from the matrix without significantly reacting with the asbestos. About 0.1 milliequivalent of acid per gram of asbestos gives satisfactory results. Typical mineral acids include hydrochloric, sulfuric, phosphoric and the like.

The mineral acids aforesaid are likewise suitable for reacting with the asbestos fibrils to produce the coating of hydrated silica on the fibril surface. As previously noted, the extent of surface modification is a function of the amount of acid and duration of treatment. By determining the amount of magnesium ions in the reaction mixture, the degree of silicilation can be computed.

Any of the strong mineral bases are suitable for effecting dissolution of the silica coating and in this connection reference is made to the alkali metal hydroxides, particularly sodium and potassium hydroxide, although the strong organic bases of the fully substituted ammonium hydroxides are likewise useful, typical members being the tetraalkyl ammonium hydroxides, e.g., tetramethylammonium hydroxide and the like. The slurry of silica coated fibrils are stirred in an aqueous solution of the base, after which the fibrils, now free of their silica coating, are filtered from the alkaline medium, washed free of alkali and dried.

The new asbestos material produced according to the invention, consists of colloidal chrysolite asbestos fibrils, the surface area of which is greatly increased as against the original precursor fibrils. At the same time, the chemical structures of the fibrils has not been chemically altered. As previously pointed out, the chrysolite colloid asbestos products heretofore does not possess a true, chrysolite surface but contain a silica coating or a layer of colloidizing agent. The present invention thus makes available to the art, a high surface area colloidal asbestos free of adhering extraneous materials.

Reference is now made to the following non-limiting examples:

EXAMPLE 1

Two grams of Cassiar AC is added to 380 ml. of water containing 1 milliequivalent of hydrogen chloride and the mixture subjected to high speed agitation for 15 minutes in a Waring blender. To the resulting slurry is then added 0.9 ml. of 37 percent hydrochloric acid and the mixture boiled for 15 minutes. The solids are filtered off, washed with water and then shaken for a few minutes in a solution of 10 g. of sodium hydroxide in 400 ml. of water. The solids are then filtered off and washed on the funnel until free of alkali and dried.

The surface area of the acid treated product is 134 square meters per gram, which drops to 90 square meters per gram after treatment with caustic.

EXAMPLE 2

Two grams Cassiar AC asbestos, 380 ml. water and 1 milliequivalent hydrogen chloride are treated in the Waring blender for 15 minutes. 0.9 ml. 37 percent hydrochloric acid is added, and the system boiled for 20 minutes. The system is filtered, and solids carefully washed and oven dried. Samples of the dried material are carefully weighed out, and added to 100 ml. caustic solution (30 g. sodium hydroxide + 600 ml. water). Each flask is periodically shaken. At definite time intervals the slurries are filtered, the solids washed and dried, and carefully weighed.

As can be seen, the data in the table show very clearly that the silica fraction of acid-treated asbestos is readily dissolved. They also clearly prove that chrysolite itself is not soluble in caustic at room temperature. The product must therefore be chrysolite; it is this material which shows the 90 square meters per gram of surface.

TABLE

| Wt. Sample (before NaOH treatment) | Wt. Sample (after treatment) | Treatment time, min. |
|---|---|---|
| 0.2001 | 0.1834 | 15 |
| 0.2000 | 0.1039 | 30 |
| 0.2002 | 0.1037 | 45 |
| 0.2000 | 0.1818 | 120 |
| 0.2002 | 0.1834 | 240 |
| 0.2002 | 0.1826 | (22½ hr.) |
| 0.2000* | 0.1972 | 30 |
| 0.2000** | 0.1949 | 45 |

\* control asbestos, shaken with caustic

\*\* acid-treated asbestos shaken with 100 ml. $H_2O$

What is claimed is:

1. As a new composition of matter, individualized fibrils of chrysotile asbestos having high surface area of unaltered chrysotile and obtained by (1) attriting chrysotile asbestos with about 0.1 millequivalent of acid to free and separate the fibrils while leaving the $SiO_2$:MgO ratio essentially unaltered; (2) acidifying the freed fibrils to form a layer of $SiO_2$ on the fibril surface and (3) removing the $SiO_2$ layer.

2. The composition according to claim 1, wherein the fibril dimensions are from about 20–50 m$\mu$ in diameter and from about 20–50 m$\mu$ in average length.

3. As a new composition of matter, individualized fibrils of chrysotile asbestos having high surface area and free of an extraneous surface layer obtained by (1) forming individual fibrils of chrysotile asbestos by stirring chrysotile asbestos with about 0.1 millequivalent of acid, the amount of which is sufficient to free the fibrils from their substrate but insufficient to significantly alter the $SiO_2$/MgO ratio of the chrysotile (2) treating the so freed fibrils with a further quantity of acid of sufficient strength and quantity to form a coating of the silica on the fibrils, (3) treating the silica-coated fibrils with caustic of sufficient strength and quantity to dissolve said silica coating, and (4) removing excess caustic from the fibrils.

4. The composition of claim 3, wherein the caustic is sodium hydroxide.

5. The composition of claim 3, wherein the acid is hydrochloric acid.

* * * * *

UNITED STATES PATENT OFFICE
CERTIFICATE OF CORRECTION

Patent No. 3,652,382  Dated March 28, 1972

Inventor(s) Alan B. Gancy

It is certified that error appears in the above-identified patent and that said Letters Patent are hereby corrected as shown below:

Cover page under Abstract line 2; Column 1, lines 16, 22, 29, 32, 41, 51, 54, 59, 60, 61; Column 2, lines 64, 69, 70; and column 3, lines 30 and 32 "chrysolite" should read --chrysotile--.

Column 2, line 3 "20-50m$\pi\lambda$" should read --20-50$\mu$--.

Signed and sealed this 12th day of March 1974.

(SEAL)
Attest:

EDWARD M. FLETCHER, JR.
Attesting Officer

C. MARSHALL DANN
Commissioner of Patents